C. CROSSAN.
HEAT RETAINER FOR OVENS.
APPLICATION FILED MAY 29, 1908.

904,311.

Patented Nov. 17, 1908.

UNITED STATES PATENT OFFICE.

CORNEILUS CROSSAN, OF JOHNSTOWN, PENNSYLVANIA.

HEAT-RETAINER FOR OVENS.

No. 904,311.

Specification of Letters Patent.

Patented Nov. 17, 1908.

Application filed May 29, 1908. Serial No. 435,806.

*To all whom it may concern:*

Be it known that I, CORNEILUS CROSSAN, a citizen of the United States of America, residing at Johnstown, in the county of Cambria and State of Pennsylvania, have invented certain new and useful Improvements in Heat-Retainers for Ovens, of which the following is a specification, reference being had therein to the accompanying drawing.

This invention relates to a heat retainer for ovens, and its primary object is to increase the efficiency of an oven as a heating medium, the retainer being designed to confine the heat of an oven centrally thereof and equally distribute the same upon the sides of an oven, whereby matter being baked or heated upon the retainer will be thoroughly cooked upon all sides.

A further object of this invention is to provide a simple, durable and inexpensive heat retainer that can be used in connection with ovens of various types.

The above objects are accomplished by a retainer constructed of a durable non-fusible material, as clay of various grades.

The detail construction entering into my invention will be presently described and then specifically pointed out in the appended claims.

Figure 1:
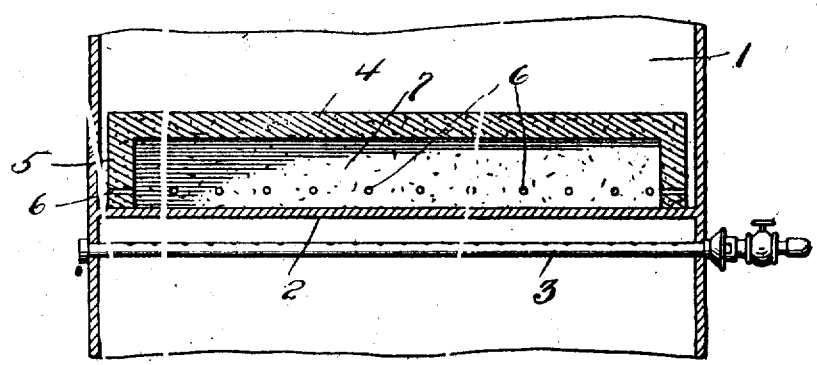
Figure 2:
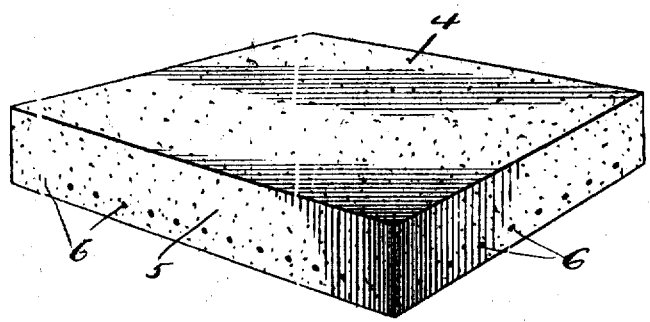

Referring to the drawings, Figure 1 is a cross sectional view of a portion of an oven containing my heat retainer, and Fig. 2 is a perspective view of the heat retainer.

In the accompanying drawings, 1 designates an oven of the conventional form having a horizontal partition 2 beneath which is located a burner 3 adapted to thoroughly heat the partition 2.

Upon the partition 2 is located my heat retainer, comprising a rectangular shell 4 having its side walls 5 provided with a plurality of longitudinally alining transverse openings 6, said openings being located adjacent to the lower edge of the retainer. The shell 4 is inverted upon the partition 2 to form a heat collecting compartment 7, and from this compartment the heat is disseminated to increase the caloric intensity of the oven.

The retainer is made from fire-clay, ball-clay, or a similar grade of clay capable of withstanding a high degree of heat and having lasting qualifications.

The heat retainer is particularly designed for baking ovens, and if a baking oven is heated by a wood fire, the fire can be withdrawn after the retainer has been heated, and bread baked directly upon the retainer. If an oven is heated by gas burners as shown, the burner can be regulated to simply maintain a pilot light, after the retainer has been heated. In both instances, considerable wood and gas can be saved.

The retainer can be made of any desired size according to the oven for which the same is used.

Having now described my invention what I claim as new, is:

1. The combination with an oven having a horizontal partition, of an inverted rectangular shell located upon said partition, the side walls of said shell having longitudinally alining transverse openings formed therein adjacent to the lower edges of said shell, substantially as described.

2. A heat retainer for ovens comprising a shell made of a non-fusible material, with the side walls of said shell provided with longitudinally alining openings adjacent to but spaced from the lower edges thereof, substantially as described.

In testimony whereof I affix my signature in the presence of two witnesses.

CORNEIL. CROSSAN.

Witnesses:
 CHARLES GALLAGHER,
 EDW. NIGHTINGALE.